(12) United States Patent
Gilbert et al.

(10) Patent No.: US 6,525,876 B1
(45) Date of Patent: Feb. 25, 2003

(54) APPARATUS FOR CHANGING OBJECTIVE LENSES IN A MICROSCOPE

(75) Inventors: Manfred Gilbert, Schoeffengrund (DE); Michael Ganser, Giessen (DE)

(73) Assignee: Leica Lasertechnik GmbH, Mannheim (DE)

( * ) Notice: Subject to any disclaimer, the term of this patent is extended or adjusted under 35 U.S.C. 154(b) by 0 days.

(21) Appl. No.: 09/678,129

(22) Filed: Oct. 4, 2000

Related U.S. Application Data

(60) Provisional application No. 60/157,436, filed on Oct. 4, 1999.

(51) Int. Cl.[7] .......................... G02B 21/00; G02B 21/26
(52) U.S. Cl. ...................... 359/391; 359/368; 359/382; 359/384
(58) Field of Search .................... 359/368–369, 359/372–373, 380–385, 388, 821, 391–393

(56) References Cited

U.S. PATENT DOCUMENTS

| | | | | |
|---|---|---|---|---|
| 2,214,367 A | * | 9/1940 | Gallasch | 359/382 |
| 4,509,834 A | * | 4/1985 | Hodgson | 359/393 |
| 4,695,137 A | * | 9/1987 | Jorgen et al. | 359/383 |
| 4,762,405 A | * | 8/1988 | Inoue et al. | 359/381 |
| 4,961,636 A | * | 10/1990 | Gaul et al. | 359/381 |
| 5,508,850 A | * | 4/1996 | Noguchi | 359/384 |
| 5,867,310 A | * | 2/1999 | Hasegawa | 359/381 |
| 5,870,222 A | * | 2/1999 | Yamamoto et al. | 359/391 |
| 6,236,503 B1 | * | 5/2001 | Kaczynski et al. | 359/391 |

* cited by examiner

*Primary Examiner*—Thong Nguyen
(74) *Attorney, Agent, or Firm*—Brown Rudnick Berlack Israels, LLP

(57) ABSTRACT

The invention describes an apparatus for changing objective lenses in a microscope, the microscope being used primarily with a microscope stage that has a so-called fixed stage arrangement. The disposition of the objective lens turret in the microscope makes it possible to avoid damaging manipulators or samples during an objective lens change. The damage is avoided due to a lateral tilt of the rotational axis of the objective lens turret relative to the first and the second side walls of the microscope. The lateral tilt of the turret also ensures that a particular part of the sample remains located in the field of view of the microscope after the lens change. The entire process of objective lens change, as well as the magnification setting and focusing necessary for the purpose, is performed in a completely automatic and motorized fashion.

16 Claims, 2 Drawing Sheets

APPARATUS FOR CHANGING OBJECTIVE LENSES IN A MICROSCOPE

CROSS REFERENCE TO A RELATED APPLICATION

This application claims priority from an earlier filed provisional patent application Serial No. 60/157,436 filed in the U.S. on Oct. 4, 1999, which provisional application is incorporated herein by reference.

FIELD OF THE INVENTION

The invention relates to an apparatus for changing objective lenses in a microscope. In particular, the invention relates to an objective lens changing device for a microscope that is used in conjunction with a stage and a fixed stage.

BACKGROUND OF THE INVENTION

When investigating sections of living tissue, it is usual to use an upright- microscope, since observation and measurement must occur from above. A plurality of manipulators, having needles or capillaries, are located in the region of the object and thus close to the objective lens. It is usual to use for this purpose a microscope having a fixed stage, in which the objective lenses are then moved for focusing. This is necessary because the manipulators do not allow movement of the stage. These microscopes are characterized in general by their crowded configuration. For example, one objective lens and at least one manipulator are directed toward one object point. These applications also require special objective lenses that are of slender configuration at the tip so that the needles can approach a sample at a certain angle. The needles or manipulators must approach samples at a certain angle to allow proper action on the preparations. Because of the substantially lateral pivoting motion, the objective lens turrets used in conventional microscopes would result in a collision between the objective lenses and manipulators. The objects being observed with the microscope are in many cases sections, cells, or cell cultures that are usually immersed in a physiological liquid. This liquid is in turn covered over. The cover is equipped with an opening through which the objective lenses can be immersed into the liquid. In order to change the objective lens, it is therefore necessary first to pull it out vertically before any pivoting motion is possible. This vertical motion is generally performed using the focusing device. Low-magnification objective lenses usually also have a greater working distance, The layer of a physiological liquid can be very thin (e.g. so that the stronger objective lenses cannot be immersed too deeply). The low-magnification objective lenses must therefore be lowered beyond the local point (and then lifted again) to create an appropriate contact with the liquid. ZEISS and NIKON offer objective lens changing devices which eliminate the pivoting motion of the objective lenses. Changing is accomplished via a combination of linear notions. In other words, first a vertical motion is performed and then an offset forward or backward, so as to displace other objective lenses located on the objective lens turret into the beam path. The mechanism necessary for this purpose is, however, not particularly stable, and in addition requires an undesirably large actuation force. Moreover, it allows changing only between two objective lenses, and also cannot readily be motorized. The brief lowering of the objective lenses that may be necessary (in order to make contact with the liquid) must still be effected separately using the focusing device. The automated microscopes of the LEICA company currently on the market, with the model designations DMRA RXA, and IRBE, lift the objective lenses away from the preparation (for immersion objective lenses) before the objective lens turret rotates and thus displaces another objective lens into the beam path.

SUMMARY OF THE INVENTION

It is an object of the present invention to create an objective lens changing device with which objective lenses can be changed in simple, motor-driven, reliable, and economical fashion. It is also an object of the present invention to provide an apparatus for objective lens changing that is suitable for performing a requisite vertical motion during the objective lens change in order to change the immersion objective lenses. The present invention also allows one to return quickly and reliably to a point on the preparation after the objective lens change. These objects are achieved by an apparatus for changing an objective lens in a microscope with a fixed stage, The microscope further comprises one end wall and two side walls joined by the end wall, and an objective lens turret which defines a rotational axis that is arranged obliquely with respect to one side wall. These objects are firer achieved by a microscope comprising a stand in which one end wall and two side walls joined by the end wall are defined, and an objective lens turret which defines a rotational axis that is arranged obliquely with respect to one side wall. The objects are further achieved by a microscope having a microscope stand defining one end wall and two side walls joined by the end wall, and having an objective lens turret that brings multiple objective lenses into a working position. The objective lens turret is positioned to allow the objective lens to engage in substantially linear motion parallel to the stage place during the lens changing procedure.

The advantage of the present invention is that the rotary motion of a conventional objective lens turret is economical and precise. The rotary motion of an objective lens turret can be easily and reliably Motorized. If the rotational axis is located obliquely with respect to a side wall of the microscope stand, the pivoting motion of the objective lenses into or out of the working position thus occurs substantially as a motion identical to a back-and-forth motion. In other words, the motion of the objective lens in the region of the working position is substantially linear. This fact offers the particular advantage that such motion prevents any collision between the manipulators and the objective lenses mounted on the objective lens turret. It is self-evident that an obliquely arranged objective lens turret of this kind can also be fitted with more than two objective lenses without becoming cumbersome and without losing the above described advantages of the lens changing arrangement and of the objective lens turret. A further advantage of the invention results from a coordinated action of the motor drive of a fine-focus apparatus and the motor drive of the objective lens turret. The coordinated action of the two different motor drives makes it possible to achieve the preferred automation of the objective lens change and a simultaneous refocusing.

DETAILED DESCRIPTION OF THE INVENTION

Figure 1:
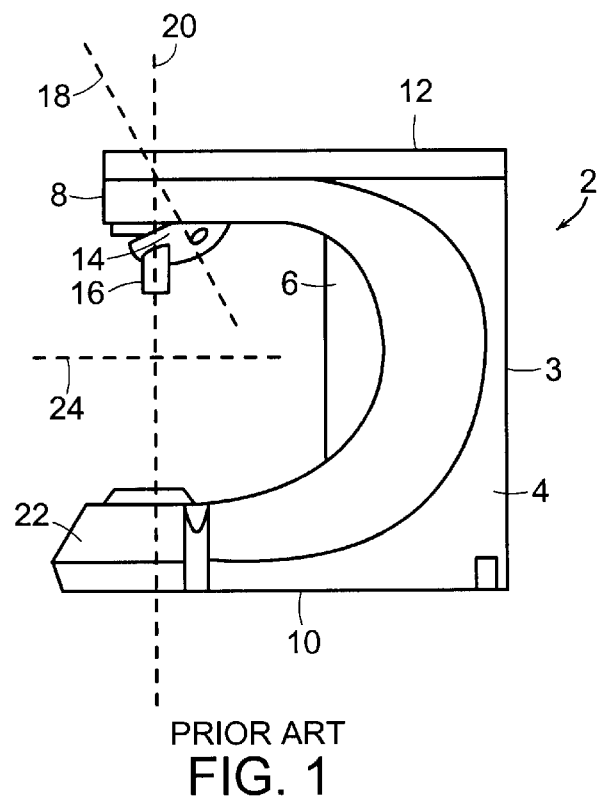
FIG. 1 is a side view of an existing microscope.
Figure 2:
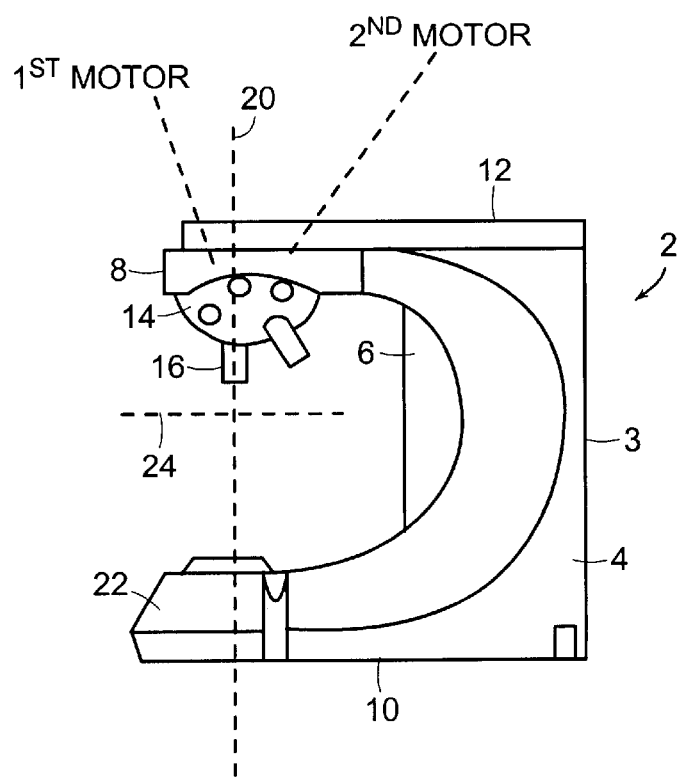
FIG. 2 is a side view of a microscope according to the invention.

FIG. 1 shows a known microscope. That microscope comprises a stand 2 that is defined by a first and a second side walls 4 and 6, and by an end wall 8. First and second side walls 4 and 6 are also joined to one another by a back wall 3. The microscope further comprises a foot part 10 and a head part 12. Mounted on head part 12 is an objective lens turret 14, which carries several objective lenses 16 that can be pivoted or rotated into a working position by the turret. Objective lens turret 14 is rotatable about an axis 18. Objective lens 16 that is located in the working position defines an optical axis 20. An illumination device 22, which illuminates an object (not depicted) located in a stage plane 24, can, for example, be provided in foot part 10 of the, microscope. Axis 18 and optical axis 20 are arranged spatially in such a way that a plane defined by them is substantially parallel to walls 4 or 6 of the microscope, FIG. 2 shows a microscope according to the present invention. In the description of the microscope identical reference numbers are used for identical components. The microscope comprises stand 2 that defines first and second side walls 4 and 6. First and second side walls 4 and 6 are joined to one another by end wall 8 and back wall 3. The microscope again has bead part 12 with objective lens turret 14 carrying multiple objective lenses 16. Objective lens turret 14 is rotatable about an rotational axis 26 (shown in FIG. 3, not shown in FIG. 2), allowing each of objective lenses 16 arranged on objective lens turret 14 to be brought into a working position. Objective lens 16 that is in a working position defines optical axis 20. Also provided in foot part 10 of the microscope is illumination device 22, which illuminates an object (not depicted) that is located in stage plane 24 of an object stage.

Figure 3:
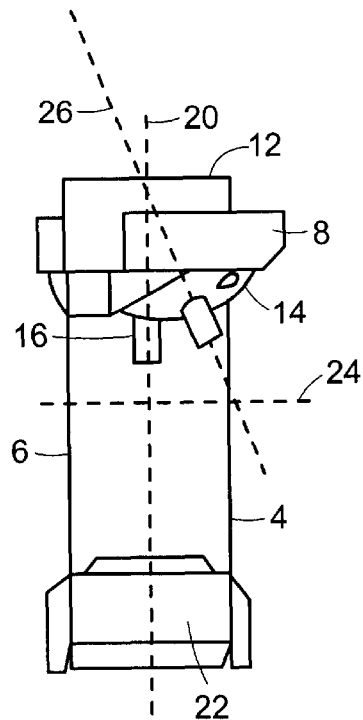
FIG. 3 is a front view of a microscope according to the present invention.
Figure 4:
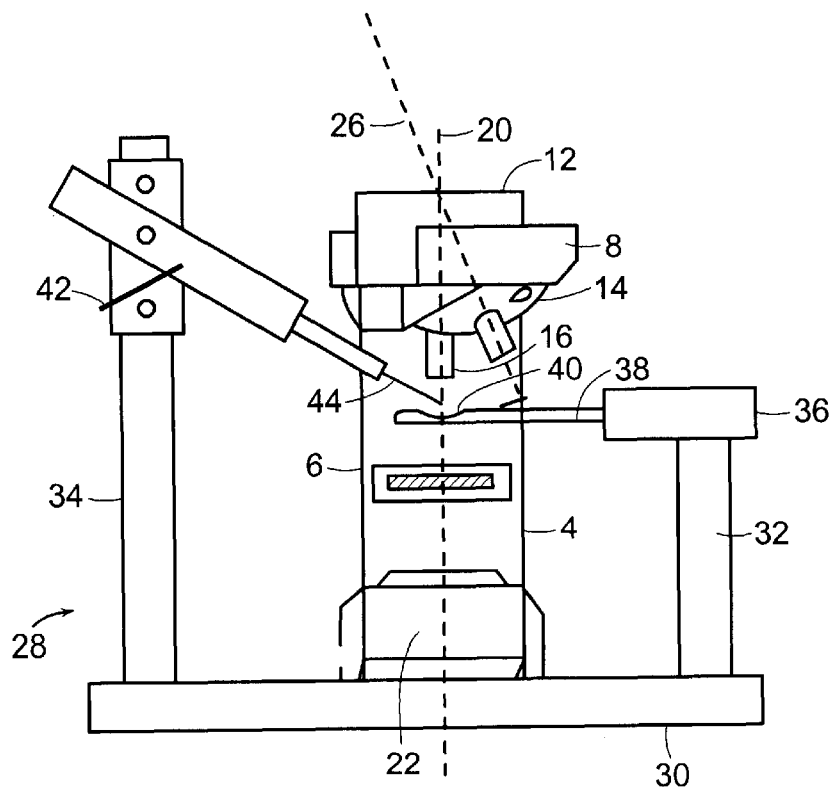
FIG. 4 is a schematic illustration of a stage and microscope arrangement according to the present invention.

The arrangement of rotational axis 26 of the objective lens turret is depicted in FIG. 3 in a front view of the microscope. As already described in FIG. 3, objective lens turret 14 rotates around rotational axis 26. Objective lens turret 14 is arranged in such a way that its rotational axis 26 is titled relative to first or second side wall 4 or 6. The tilt of rotational axis 26 relative to one of the side walls 4 and 6 can lie in the range of angles from about 10° to about 45°. In the particular embodiment illustrated in FIG. 3, the angle is 22.5°. A determination can also be made of the inclination angle between the optical axis 20 and rotational axis 26 of objective lens turret 14. As compared to the existing art (see FIG. 1), in which axis 18 of objective lens turret 14 is titled toward back wall 3 of the microscope, rotational axis 26 is arranged so that it intersects a plane defined by the first and second side walls 4 and 6. In other words, objective lens turret 14 of the microscope is arranged with a lateral tilt. In the present exemplary embodiment, the tilt is shown toward first side wall 4. The tit of objective lens turret 14 defining the tilt of rotational axis 26 provides for a substantially linear motion of the objective lenses during an objective lens change in the region of the working position "Substantially linear" means that when objective lens 16 follows, for example, a motion curve that is directed from end wall 8 toward back wall 3, the objective lens moves along a straight line. "Lateral tilt" means that rotational axis 26 is not parallel to the direction of axis 18 in FIG. 1. The direction of axis 18 in FIG. 1 is substantially backward relative to the microscope stand. The direction of rotational axis 26 is not backward. In other words, it can be said that a plane defined by axis 18 and optical axis 20 (FIG. 1) and a plane defined by optical axis 20 and rotational axis 26 in FIGS. 2–4 are not coplanar In a particular embodiment illustrated in FIGS. 2–4 the two planes are substantially perpendicular. As shown in FIG. 3 and FIG. 4, the lateral tilt makes it so that all objective lenses 16 on turret 14 are disposed in the section of the microscope defined by the plane containing optical axis 20 and being parallel to side walls 4 and 6 and a direction toward side wall 4 In other words, no objective lens is disposed in the section of the microscope defined by the plane containing optical axis 20 and being parallel to side walls 4 and 6 and a direction toward side wall 6. As follows from the disposition of turret 14 and objective lenses 16 in FIGS. 3 and 4, when turret 14 rotates around rotational axis 26, the objective lenses move only in the section of the microscope defined by the plane containing optical axis 20 and being parallel to side walls 4 and 6 and a direction toward side wall 4.

FIG. 4 shows the microscope having objective lens turret 14 together with a working stage 28. Working stage 28 comprises a base plate 30 on which a first mount 32 and a second mount 34 are secured First mount 32 is coupled to a holding element 36 to which a stage 38 is attached. Stage 38 is configured as a so-called fixed stage. A depression 40 for holding a sample (not depicted) is provided on stage 38. Since the sample is illuminated from below, stage 38 or depression 40 are transparent. Second mount 34 is coupled to a manipulator 42 having a front end to which a needle 44 or a pipette or the like can be attached. Manipulator 42 and needle 44 attached thereto are used to pick the object, much as, for example, a biological cell, and modify the sample. In the present exemplary embodiment, the microscope stands on base plate 30.

It is apparent to one skilled in the art that any other arrangement of stage 38 and the microscope ensuring that depression 40 of stage 38 and illumination device 22 of the microscope are aligned along optical axis 20 is contemplated by the invention FIG. 4 also makes clear the advantage of the lateral tilt of rotational axis 26 in accordance with present invention. Because of the arrangement of manipulator 42 with needle 44, the rotational motion of a conventionally positioned objective lens turret shown in FIG. 1 is considerably limited on the manipulator side of working stage 28. A rotation of the objective lens turret in FIG. 1 could very easily damage needle 44 As already described above, the lateral tilt of rotational axis 26 of the present invention makes objective lens 16 move along a motion curve extending from end wall 8 toward back wall 3 of the microscope during the lens changing procedure. That motion curve of objective lens 16 is substantially linear in the region of depression 40 or needle 44 of manipulator 42. An outwardly pivoting motion of the objective lenses toward needle 44 of manipulator 42 is eliminated, and the risk of damage is considerably reduced.

A physiological liquid with cell cultures or cells is deposited into depression 40 of stage 38. For microscopic examination, the objective lenses are then immersed into the physiological liquid. For an objective lens change, the part of the microscope that carries objective lens turret 14 must be displaced accordingly. In the present exemplary embodiment, the displacement is accomplished by a motor (for reasons of clarity, the motor and the mechanism necessary therefore are not depicted). When an objective lens needs to be changed, the part of the microscope that carries objective lens turret 14 is lifted along optical axis 20. As a result, objective lens 16 is removed from the physiological liquid and then moved away from the manipulators, reliably preventing damage to the needle and making it possible to change lenses unobstructedly. Once the objective lens is removed from the liquid to a position where lens turret 14 can rotate unobstructedly, another motor (not depicted) can rotate objective lens turret 14 about its rotational axis 26 and bring a new objective lens 16 into the working position in alignment with optical axis 20. The first motor can now lower the part of the microscope carrying objective lens turret 14 along optical axis 20, into the liquid. The lowering step is performed in such a way that the new objective lens becomes immersed in the physiological liquid deeper than necessary, to achieve sufficient moistening of the front of the objective lens Objective lens 16 is then moved back to an imprecisely focused position, and then fine focusing is performed using an auto focusing device (not depicted). The lateral tilt of objective lens turret 14 of the present invention makes it possible to automate the process of placing the new objective lens above the same region of the sample that was examined before the lens change. Thus ensuring that the same part of the object is located in the field of view of the microscope after the objective lens change.

The invention has been described with reference to a particular embodiment, but it is apparent to one skilled in the art that modifications and variations can be made without departing from the scope of the appended claims.

What is claimed is:

1. An apparatus for changing objective lenses comprising:

a microscope stand having a foot part, a head part a first side wall and a second side wall;

a turret being rotatably mounted on the head part and defining a rotational axis;

a plurality of spaced apart objective lenses disposed on the turret symmetrically relative to the rotational axis in such a way that rotation of the turret about the rotational axis brings an objective lens into a working position, the objective lens in the working position defining an optical axis, the objective lenses being disposed in a section of the microscope defined by a plane containing the optical axis and being parallel to the first and the second side walls and a direction toward the first side wall; and the rotational axis forming an angle with the optical axis and being laterally tilted relative to the microscope stand.

2. The apparatus of claim 1, wherein the angle between the rotational axis of the turret and the optical axis is in the range from about 10° to about 45°.

3. The apparatus of claim 1, further comprising a motor for rotating the turret during a change from one objective lens to another objective lens.

4. The apparatus of claim 1 further comprising a stage disposed substantially perpendicular to the optical axis.

5. The apparatus of claim 4, wherein the objective lens defining the optical axis engages in a substantially linear motion parallel to the stage while being brought into the working position.

6. A microscope having an apparatus for changing objective lenses comprising:

a stand defined by a first and a second side walls;

a head part joined with the first and second side walls, the head part having a turret rotatably mounted on it;

the turret defining a rotational axis and having a plurality of spaced apart objective lenses disposed in such a way that rotation of the turret around the rotational axis brings an objective lens into a working position, the objective lens in the working position defining an optical axis, the objective lenses being disposed in a section of the microscope defined by a plane containing the optical axis and being parallel to the first and the second side walls and a direction toward the first side wall; and the rotational axis forming an angle with the optical axis and being laterally tilted relative to either the first or the second side wall.

7. The microscope of claim 6, wherein an angle between the rotational axis and the optical axis is in the range from about 10° to about 45°.

8. The microscope of claim 6, fiber comprising a first motor for moving the turret along the optical axis.

9. The microscope of claim 8, further comprising a second motor for rotating the turret around the rotational axis.

10. A system for microscopic examination of a sample, the system comprising.

a microscope stand having a foot part, a head part, a first side wall and a second side wall, a turret being rotatably mounted on the head part and defining a rotational axis, a plurality of spaced apart objective lenses disposed on the turret symmetrically relative to the rotational axis in such a way that rotation of the turret about the rotational axis brings an objective lens into a working position, the objective lens in the working position defining an optical axis, the objective lenses being disposed in a section of the microscope defined by a plane containing the optical axis and being parallel to the first and the second side walls and a direction toward the first side wall, and the rotational axis forming an angle with the optical axis and being laterally tilted relative to the microscope stand; and a working stage coupled to the microscope, the working stage comprising a fixed stage having a portion for holding the sample, the portion for holding the sample being disposed along the optical axis.

11. The system of claim 10, further comprising an illumination device disposed along the optical axis.

12. The system of claim 10, further comprising a manipulator coupled to the working stage for manipulating the sample.

13. The system of claim 10, wherein the portion for holding the sample is formed by a depression in the fixed stage.

14. The system of claim 10, wherein the angle between the rotational axis and the optical axis is in the range from about 10° to about 45°.

15. The system of claim 10, wherein the fixed stage is made of a transparent material.

16. The system of claim 10, wherein the objective lens defining the optical axis engages in a substantially linear motion parallel to the working stage while being brought into the working position.

* * * * *